United States Patent
Kikuyama et al.

(10) Patent No.: US 6,905,606 B1
(45) Date of Patent: Jun. 14, 2005

(54) METHOD OF REMOVING CALCIUM FROM WATER CONTAINING CALCIUM HYDROGEN CARBONATE IN HIGH CONCENTRATION

(75) Inventors: Hirohisa Kikuyama, Osaka-fu (JP); Toshirou Fukudome, Osaka-fu (JP); Masayuki Miyashita, Osaka-fu (JP)

(73) Assignee: Stella Chemifa Kabushiki Kaisha (JP)

( * ) Notice: Subject to any disclaimer, the term of this patent is extended or adjusted under 35 U.S.C. 154(b) by 0 days.

(21) Appl. No.: 09/890,470
(22) PCT Filed: Jan. 28, 2000
(86) PCT No.: PCT/JP00/00470
§ 371 (c)(1), (2), (4) Date: Feb. 12, 2002
(87) PCT Pub. No.: WO00/46156
PCT Pub. Date: Aug. 10, 2000

(30) Foreign Application Priority Data
Feb. 1, 1999 (JP) ............................................. 11-024444

(51) Int. Cl.$^7$ .................................................. C02F 1/58
(52) U.S. Cl. ........................ 210/724; 210/726; 210/915
(58) Field of Search ................................. 210/702, 712, 210/713, 714, 724, 726, 915

(56) References Cited

U.S. PATENT DOCUMENTS

| | | | | | |
|---|---|---|---|---|---|
| 2,359,748 A | * | 10/1944 | Clemens | ...................... | 210/711 |
| 4,036,749 A | * | 7/1977 | Anderson | .................... | 210/638 |
| 4,059,513 A | * | 11/1977 | Zadera | ........................ | 210/696 |
| 5,240,600 A | * | 8/1993 | Wang et al. | ................. | 210/188 |
| 5,403,495 A | * | 4/1995 | Kust et al. | ................... | 210/710 |
| 6,331,256 B1 | * | 12/2001 | Kezuka et al. | .............. | 210/712 |

FOREIGN PATENT DOCUMENTS

| | | |
|---|---|---|
| JP | 48-14572 A | 2/1973 |
| JP | 58-89985 A | 5/1983 |

* cited by examiner

Primary Examiner—Peter A. Hruskoci
(74) Attorney, Agent, or Firm—Randall J. Knuth

(57) ABSTRACT

A method for removing calcium from water containing a high concentration of calcium bicarbonate, permitting a reduction of the calcium bicarbonate equivalent to 200–500 ppm calcium to the level in accordance with the water quality standards for industrial use, not by a method using a large amount of heat and power as heating and deairing, but by a simple chemical treatment. Calcium hydroxide is added to waste water containing a high concentration of calcium in a form of calcium bicarbonate for making them react with each other, and removing calcium by fixing it to calcium bicarbonate.

5 Claims, 1 Drawing Sheet

METHOD OF REMOVING CALCIUM FROM WATER CONTAINING CALCIUM HYDROGEN CARBONATE IN HIGH CONCENTRATION

BACKGROUND OF THE INVENTION

1. Field of the invention.

The present invention relates to a method for removing calcium from water containing a high concentration of calcium bicarbonate.

More specifically, this invention relates to a method for removing calcium from defluorinated waste water by making the waste water containing fluorine react with calcium carbonate.

In semiconductor device manufacturing plants, a large quantity of water such as ultrapure water or the like is used for washing, in addition to other agents such as hydrofluoric acid, ammonium fluoride. Reuse of the water by recovery and is an important problem.

2. Description of the related art.

Fluorinated agents consumed in a semiconductor, device manufacturing plant are wasted with a large quantity of wash water.

In general, this waste water is processed with hydrated lime. Namely, fluoride is wasted as poorly-soluble, calcium fluoride, and water is drained out in a 15 ppm or less concentration of fluorine.

Recovery of fluoride has been examined from the viewpoints of effective resource recovery and waste reduction.

In order to recover fluorine as calcium fluoride of reusable quality, a conventional process by neutralization with hydrated lime results in producing too fine particles of calcium fluoride to separate, handle, and dry them, and the process is too difficult to be put into practice.

In order to obtain calcium fluoride of reusable quality, it is necessary to use calcium carbonate as a source of calcium. Calcium carbonate reacts with fluorine and is converted into calcium fluoride without change in its original shape and size. Namely, by using calcium fluoride having a 50 $\mu$m average particle diameter, calcium fluoride of approximately a 50 $\mu$m average particle diameter can be obtained, and this process operates with good efficiencies in dehydration and separation.

By removing fluorine by means of the above-mentioned neutralization method using calcium carbonate, the fluorine in the drain can be reduced to approximately 5 ppm and cleaned, treated water can be obtained.

Moreover, according to this neutralization method, calcium is removed as $CaF_2$. Also, since excess calcium carbonate precipitates as it is, it has been considered that Ca is not contained in the drain water after treatment.

Nevertheless, through detail examinations of this treated water, it has been found out that there is quite a large amount of calcium remained in the treated water. Namely, it has been found out that there is as much calcium as exceeding 75 pm in alkalinity ($CaCO_3$) and 120 ppm in hardness ($CaCO_2$) specified as the water quality standards for industrial use.

For this reason, as a result of zealous search into the cause, the applicants of the present invention have considered that calcium remains therein for the following reason.

Namely, carbon dioxide is by-produced by the reaction between calcium carbonate and hydrofluoric acid as shown in the following reaction formulae.

$$CaCO_3 + 2HF \rightarrow CaF_2 + CO_2 + H_2O \ldots \quad (1)$$

Carbon dioxide produced here is dissolved in water to produce a carbonic acid.

$$H_2O + CO_2 \rightarrow H_2CO_3 \ldots \quad (2)$$

It is considered that calcium bicarbonate is relatively soluble, therefore, calcium remains in the drain water after treatment.

The applicants of the present invention have confirmed that after de-fluorinating waste water of about 500–1000 ppm fluorine concentrations with calcium carbonate, it contains about 200–500 ppm calcium dissolved therein.

Thus, water of high calcium concentration cannot be reused even as cooling water as it is, because it causes troubles such as scaling.

It is necessary to reduce its alkalinity ($CaCO_3$) and hardness ($CaCO_2$) to about 75 ppm and 120 ppm specified by the water quality standards for industrial use.

On the other hand, as methods for reducing the alkalinity and hardness, various methods such as classical methods as a degassing process, distillation process, an activated carbon absorption process, etc., and a ion-exchanger membrane process, dialysis membrane process, etc. have been provided.

However, it is limited from viewpoints of a life of equipment and its running costs to treat a large-quantity of water of calcium concentration as high as 400–500 ppm.

This purpose of the present invention is to provide a method for removing calcium from water containing a high concentration of calcium bicarbonate, permitting to reduce calcium bicarbonate equivalent to 200–500 ppm as calcium to the level in accordance with the water quality standards for industrial use by means of a simple chemical treatment and not by means of using much heat and power for heating and deaeration.

SUMMARY OF THE INVENTION

This invention provides a method for removing calcium from water containing a high concentration of calcium bicarbonate, characterized in removing calcium by adding calcium hydroxide to waste water containing a high concentration of calcium formed as calcium bicarbonate, making the waste-water react with it, and immobilizing calcium as calcium carbonate.

The applicants of the present invention have tested and examined the method for reducing the dissolved calcium bicarbonate not by using such physical methods as heating and deairing, but by using, what is called, a chemical method.

The calcium dissolved as calcium bicarbonate can be removed by converting it into a poorly-soluble calcium salt.

As poorly-soluble salts, calcium fluoride (CaF2), calcium carbonate (CaCO3), hydroxy-apatite ($Ca_{10}(PO_4)_8(OH)_2$), etc. can be mentioned.

Each solubility at normal temperature is as shown in Table 1, and any of them is less than 10 ppm as concentrations of Ca.

TABLE 1

| Kinds of Salt | Solubility | Ca concentration (ppm) |
| --- | --- | --- |
| Calcium fluoride | 0.016 g/l | 8 |
| Calcium carbonate | 0.013 g/l | 5 |
| Apatite | $Ca^{2+}$ 0.000123 M/l | 5 |

As a method for converting calcium bicarbonate dissolved in water into a poorly-soluble calcium salt, the following reactions can be mentioned, and each method has been examined.

(1) A method for removing calcium as calcium fluoride:

$$Ca(HCO_3)_2 + 2HF \rightarrow CaF_2\downarrow + 2CO_2\uparrow + 2H_2O$$

In this reaction, CAF2 is precipitated and Ca concentration is reduced. If hydrofluoric acid is added too much, the water under treatment may be increased in F concentration. In such a case, it is necessary to remove fluorine by adding a proper quantity of calcium hydroxide.

(2) A method for removing calcium as calcium carbonate:

$$Ca(HCO_3)_3 + Ca(OH)_2 \rightarrow 2CaCO_3\downarrow + 2H_2O$$

Calcium carbonate is precipitated by adding calcium hydroxide. In this reaction, coexisting $HCO_3^{2-}$ is also removed as calcium carbonate at the same time, therefore, it is very reasonable for purifying the water.

(3) A method for removing calcium as apatite:

$$10Ca(HCO_3)_2 + 6H_3PO_4 \rightarrow Ca_{10}(PO_4)_6(OH)_2\downarrow + 20Co_2\uparrow + 18H_2O$$

Hydroxy-apatite is precipitated by adding phosphoric acid, however, this reaction is considered to be conditional on a hydrogen ion concentrations (pH) or the like, and it is difficult to select the conditions, and the examinations by the applicants of the present invention did not result in almost anything like precipitation.

From the above, as a method for fixing and removing calcium dissolved as calcium bicarbonate, such a method is most reasonable, as calcium is fixed and removed as calcium carbonate having a very poor solubility by adding calcium hydroxide thereto.

This reaction does not require hating or cooling, but can sufficiently be achieved at an ordinary temperature.

The reaction is performed while stirring, and either one of an palindromic or batch system and a continuous system will do. A schematic diagram of a continuous treatment flow is shown in FIG. 1.

Since the reaction is completed instantaneously, it is not necessary to take a long time for it but only 30 minutes are enough. In the case of the continuous system, two treating tanks having a residence time of about 30 minutes may be cascaded for preventing a short pass.

Also in the case shown in FIG. 1, a $1^{st}$ treating tank 2 and a $2^{nd}$ treating tank 3 are arranged in series. A waste water tank 1 is coupled to the $1^{st}$ treating tank 2 via a flow controller 5. The waste water in the waste water tank 1 flows out of the bottom of the waste water tank 1, and flows into $1^{st}$ treating tank from the top of it. Calcium hydroxide is added into the $1^{st}$ treating tank 2 from outside. The liquid overflowing from the 19 treating tank 2 flows into the $2^{nd}$ treating tank 3 from the top of it. A precipitation tank 4 is coupled downstream from the $2^{nd}$ treating tank 3. The liquid overflowing from the $2^{nd}$ treating tank 3 flows into the precipitation tank 4, and solid-liquid separation is performed in the precipitation tank 4. The liquid overflowing the precipitation tank 4 is supplied for reuse as supernatant liquid. Slurry containing solids precipitated in the precipitation tank 4 is forwarded to a dehydrating separator.

The treating tanks 2, 3 each are provided with respective stirrers 6, 7, which stir and mix up the liquid, the waste water, to be treated, and calcium hydroxide.

The products of the reaction are separated into solids and liquid according to a conventional method. Prior to the solid-liquid separation, it is preferable to concentrate the precipitates by using the precipitation tank, a thickener, or the like. Moreover, in this case, the equipment can do with a smaller capacity by accelerating the precipitation using a small quantity of a polymer coagulant. For solid-liquid separation, a conventional use dehydrating separator such as a centrifugal separator machine, a vacuum filter, a filter press are used.

The above-mentioned and other features and advantages of this invention, and the manner of attaining them, will become more apparent and the invention will be better understood by reference to the following description of an embodiment of the invention taken in conjunction with the accompanying drawings, wherein:

BRIEF DESCRIPTION OF THE DRAWINGS

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
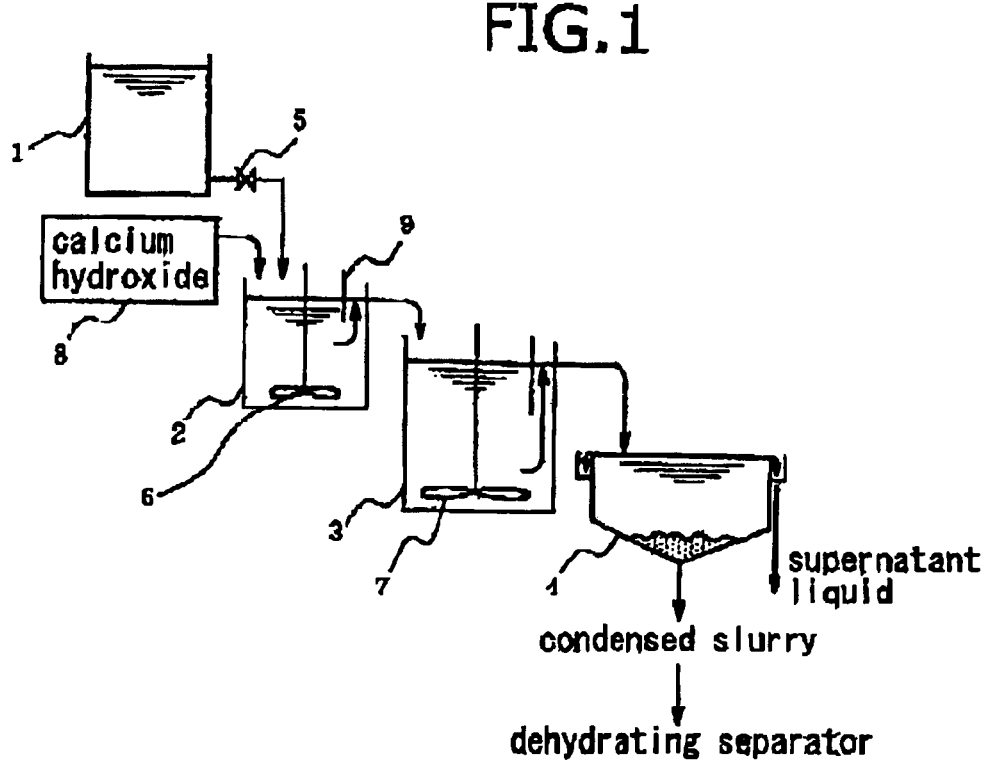
FIG. 1 is a schematic flow diagram of a continuous treatment in accordance with the present invention.

1: Waste water tank, 2: $1^{st}$ treating tank, 3: $2^{nd}$ treating tank, 4: precipitation tank, 5: Flow controller, 6, 7: Stirrer, 8: Calcium hydroxide adding equipment, and 9: pH meter.

BEST MODE FOR EMBODYING THE INVENTION

The method of the present invention is disclosed in details by showing embodiments in the following.

Embodiment 1

Treated water of pH- 7 containing 4 ppm F and 240 ppm Ca has been obtained by making waste water containing 5000 ppm HF pass through a calcium carbonate packed tower. When one liter of this treated water was sampled and a calcium reduction effect was examined varying an adding rate of calcium hydroxide, the results were obtained as shown in Table 2.

TABLE 2

| Adding rate of calcium hydroxide | pH of treated water | Concentration of Ca (ppm) | XRD of solids obtained |
| --- | --- | --- | --- |
| 50% of equivalent wt. | 7.9 | 110 | coincides with peak of $CaCO_3$ |
| 75% of equivalent wt. | 8.3 | 56 | coincides with peak of $CaCO_3$ |

TABLE 2-continued

| Adding rate of calcium hydroxide | pH of treated water | Concentration of Ca (ppm) | XRD of solids obtained |
|---|---|---|---|
| 100% of equivalent wt. | 10.0 | 18 | coincides with peak of $CaCO_3$ |
| 125% of equivalent wt. | 11.1 | 66 | coincides with peak of $CaCO_3$ |
| 150% equivalent wt. | 11.7 | 97 | coincides with peak of $CaCO_3$ and a quantity of $Ca(OH)_3$ coexists |

The best calcium reduction effect could be obtained when an adding rate of calcium hydroxide was equivalent to the calcium concentration.

The solid obtained was calcium carbonate ($CaCO_3$).

Embodiment 2

Drain water, which was obtained by making waste water it containing 5000 ppm HF pass through a packed tower with a 1.5 m calcium carbonate layer height and defluorinating the waste water, exhibited p=7.5, P=4 ppm, and Ca=270 ppm. From such an analysis as one liter of this drain water was sampled; 0.53 (Ca equivalent) calcium hydroxide of 95% purity was added to the water; it was treated for 30 minutes; and solid-liquid separated and analyzed, the results were obtained as shown in Table 3.

TABLE 3

| pH of treated water | Concentration of Ca (ppm) | Amount of solids obtained (g) | XRD of solids obtained |
|---|---|---|---|
| 9.9 | 21 | 1.20 | Coincides with peak of $CaCO_3$ |

Embodiment 3

10 liters of drain water exhibiting pH=7.5, F=4 ppm, and Ca=240 ppm by making waste water containing 5000 ppm HF pass through a packed tower with calcium carbonate of 1.5 m layer height.

While making this drain water pass through the $1^{st}$ tank of one liter capacity and the $2^{nd}$ tank of two liters capacity arranged in series as shown in FIG. 1 at a treating rate of two liters/hour, the drain water was continuously treated for 5 hours by adding 0.23 g (Ca equivalent) calcium hydroxide of 95% purity into the $1^{st}$ tank 2 at 30 minute intervals, and analyzed and measured by sampling the treated water overflowing from the $2^{nd}$ treating tank 3 at every prescribed hours, to obtain the results as shown in Table 4.

TABLE 4

| Elapsed Time | pH | Concentration of Ca (ppm) | XRD of solids obtained |
|---|---|---|---|
| 2 hours | 8.9 | 22 | coincides with peak of $CaCO_3$ |
| 3 hours | 10.1 | 18 | coincides with peak of $CaCO_3$ |
| 4 hours | 9.8 | 23 | coincides with peak of $CaCO_3$ |

Ca was stably reduced to 30 ppm or smaller also by a continuous treatment system, and cleared the water quality standards.

Embodiment 4

Waste water containing 5000 ppm HF was defluorination treated by making the water pass through a packed tower with calcium carbonate. The analysis of the drain water exhibited pH=6.8, F=3 ppm, and Ca 480 ppm.

After one liter of this drain water was stirred for 30 minutes by adding 1.40 g calcium hydroxide of 95% purity threreto the drain water was separated into solids and liquid, then the analysis exhibited the results as shown in Table 5.

TABLE 5

| PH | F (ppm) | Ca (ppm) | XRD of solids obtained |
|---|---|---|---|
| 10.2 | 2 | 27 | coincides with peak of $CaCO_3$ |

Embodiment 5

Four liters of waste water treated through the calcium carbonate packed tower exhibiting pH=6.8, F=3 ppm, and Ca=270 ppm were treated by adding calcium hydroxide thereto so as to obtain prescribed pH values, and the analysis performed according to each pH value exhibited the results as shown in Table 6.

TABLE 6

| pH | 8 | 8.5 | 9.5 | 10 | 10.5 | 11 |
|---|---|---|---|---|---|---|
| Ca (ppm) | 100 | 36 | 26 | 20 | 25 | 65 |

As shown in Table 6, it can be seen that a removal rate of Ca is significantly improved in the range of pH=8.5–10.5.

Embodiment 6

Four liters of waste water treated through the calcium carbonate packed tower exhibiting pH=6.8, F=3 ppm, and Ca=270 ppm were treated by adding thereto 5.4 g calcium hydroxide of 96% purity so that pH value of the water becomes 10, and Table 7 shows the results of the analysis by sampling the water at each elapsed time.

TABLE 7

| Reaction time (min) | 5 | 15 | 30 | 60 | 120 |
|---|---|---|---|---|---|
| Ca (ppm) | 33 | 28 | 27 | 23 | 23 |

As shown in Table 7, the reaction is completed within a short time, and the water is sufficiently treated in 15–30 minutes. It can be seen from the table that the treatment is. preferably carried out in 15–30 minutes because the effect is saturated even if it exceeds 30 minutes.

Industrial Utility

According to the present invention, in the case of effectively recover calcium fluoride by treating fluorine containing waste water drained out of, for example, a semiconductor manufacturing plant with calcium carbonate, it is possible to reduce Ca concentration to a level to clear the water quality standards for industrial use by such a simple chemical treatment as calcium carbonate is added to waste water dissolving calcium bicarbonate with 200–500 ppm calcium concentration and stirred and reacted at ordinary temperatures, and this contributes to reuse of water resource.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for removing calcium from waste water containing a concentration of calcium bicarbonate, the concentration of calcium bicarbonate being at least about 200 ppm, wherein the waste water is waste water defluorinated by adding calcium carbonate to primary waste water containing HF, comprising the steps of:

adding calcium hydroxide to the waste water containing a concentration of at least about 200 ppm of calcium in a form of calcium bicarbonate to cause the pH of the waste water to range from 8.5 to 10.5, the quantity of calcium hydroxide to be added ranging in 75 to 125% of the equivalent weight to calcium; and removing the calcium by precipitation thereof in the form of calcium carbonate.

2. A method for removing calcium from waste water containing a concentration of calcium bicarbonate claimed according to claim 1, in which the quantity of calcium hydroxide to be added ranges in 90 to 110% of the equivalent weight to calcium.

3. A method for removing calcium from waste water containing a concentration of calcium bicarbonate claimed according to claim 1, in which the waste water contains about 200 ppm to 500 ppm of said calcium bicarbonate.

4. A method for removing calcium from waste water containing a concentration of calcium bicarbonate, the concentration of calcium bicarbonate being at least about 200 ppm, wherein the waste water is waste water deflourinated by adding calcium carbonate to primary waste water containing HF, comprising the steps of:

adding calcium hydroxide to the waste water containing a concentration of at least about 200 ppm of calcium in a form of calcium bicarbonate in a quantity of at least about 75% of the equivalent weight to calcium;

said adding step including that the calcium hydroxide added causes the pH of the waste water to range from 8.5 to 10.5; and removing the calcium by precipitation thereof in the form of calcium carbonate.

5. A method for removing calcium from waste water containing a concentration of calcium bicarbonate claimed according to claim 4, in which the waste water contains said calcium bicarbonate of about 200 ppm to about 500 ppm.

* * * * *